United States Patent [19]

Mercier

[11] 4,164,429
[45] Aug. 14, 1979

[54] PROCESS AND INSTALLATION FOR THE PRODUCTION OF SELECTED CRYSTALLIZATION SEEDS FOR USE IN A SUGAR REFINERY

[75] Inventor: André Mercier, La Madeleine, France

[73] Assignee: Fives-Cail Babcock, Paris, France

[21] Appl. No.: 860,043

[22] Filed: Dec. 13, 1977

[30] Foreign Application Priority Data

Dec. 14, 1976 [FR] France ................. 76 37581

[51] Int. Cl.² ................. C13F 1/02; C13F 1/06
[52] U.S. Cl. ................. 127/15; 23/301; 127/16; 127/19; 127/60; 127/61; 127/62; 422/245; 422/253
[58] Field of Search ................. 127/15, 16, 19, 60, 127/61, 62, 24; 23/301; 422/245, 253

[56] References Cited

U.S. PATENT DOCUMENTS

| | | | |
|---|---|---|---|
| 2,772,990 | 12/1956 | Hage | 127/24 X |
| 2,974,068 | 3/1961 | Fontein | 127/24 X |
| 3,220,883 | 11/1965 | Howard | 127/60 X |
| 3,273,790 | 9/1966 | Dahlberg | 127/24 X |
| 3,503,803 | 3/1970 | Bennett | 127/61 X |
| 3,642,534 | 2/1972 | de Cremoux | 127/16 X |
| 4,009,045 | 2/1977 | Petri | 127/56 X |

OTHER PUBLICATIONS

Sugar Industry Abstracts, 29(6), Abstract 522 (1967).

Primary Examiner—Sidney Marantz
Attorney, Agent, or Firm—Kurt Kelman

[57] ABSTRACT

Process, centrifuge and installation for producing crystallization seeds, as for the sugar industry. A suspension of crystals produced from the seeded solution is subjected to a scheme of centrifugal separations whereby seeds falling within a predetermined size range are obtained for seeding the solution.

10 Claims, 4 Drawing Figures

PROCESS AND INSTALLATION FOR THE PRODUCTION OF SELECTED CRYSTALLIZATION SEEDS FOR USE IN A SUGAR REFINERY

A crystallizing apparatus, which has as its object the extraction of the mother liquor and the production of crystals of a predetermined dimension, must initially be fed with a suitable number of crystallization seeds to assure the realization of these conditions. When the apparatus is for continuous production, the number of seeds delivered must be proportional to the output of the apparatus.

This first crystallization phase, which consists of the introduction of seeds and the beginning of their growth is difficult to effectuate, considering the very small size of the introduced seeds and the risk of significant variations in the initial crystal population by local remelting of fines (crystals of very small dimensions) or by agglomerations.

This risk is particularly high in the last strike of crystallization of a sugar refinery, considering the low purity of the treated molasses, their high viscosity and the correspondingly low speed of crystallization.

Frequently, in discontinuous crystallization, this difficulty is reduced by effectuating the operation in two stages:

In the first stage, starting with crystallization seeds, one obtains crystals of a sufficient size to be certain that they will retain their identity in the following operations (of the order of 100 to 180μ). For this stage, one uses molasses of higher purity (for example molasses of the first strike or refinement instead of the molasses of the second strike for a scheme of three strikes) and one effectuates the operation starting with an excess of seeds and by producing partial remelts in the course of the cycle to restore them empirically to the envisaged crystal population; this manner of operation, however, does not avoid the existence of insufficient crystal populations, leading to the formation of fines in the second stage of crystallization.

In the second stage, the massecuite obtained in the preceding stage, which is called footings, serves as seeds for the continuation of the crystallization operation, the crystallizer having been fed by the normal molasses to extract (in the preceding case, the molasses of the second strike).

This manner of proceeding has the disadvantage that it requires the introduction of relatively pure molasses for the last strike of crystallization (to constitute the footings), hence a less favorable extraction of molasses is attained at the crystallization plant, all other conditions being equal. On the other hand, such a process is difficult to reproduce in viable fashion in an entirely continuous process, considering the previously indicated difficulties for controlling the first part of the crystallization (growth of the seeds to 100 to 180μ).

The invention has as object a process and installation for the continuous production crystals in a narrow range of dimensions which, when suspended at a constant content in a saturated solution, permits feeding a crystallization apparatus with a controllable population of crystals substantially proportional to the volume of the solution to be treated.

It is well known that, for an optimum extraction of the molasses, it is necessary to have a high crystal population to increase the surface of crystallization and to reduce the average distance between crystals; on the other hand, the smaller crystals must be big enough not to run the risk of remelting in the treatment cycle and to limit the granulometric dispersion of the resultant sugar. These two imperatives require lower and upper limits in the range of the granule sizes of the crystal products according to the invention.

The process of the invention uses the crushing and screening of crystals in a humid state after which they are suspended in a saturated solution to form a magma.

The first selection is made in a first drier by passing the magma over a screen with large openings. The liquid phase entraining the crystals of small size is directed to a second drier which effectuates the second selection with a screen having smaller openings.

The oversized crystals from the first drier are crushed and then recycled. The oversized crystals from the second drier constitute the selected crystals and are suspended in a saturated solution to be utilized as crystallization seeds. The molasses from this drier containing fines is placed into a state of under-saturation by the addition of water and, after heating, is recycled.

Even if a dispersion is produced in the growth of the crystals in the crystallizer, it is impossible, due to the process of the invention, to obtain fines passing through the screen of the drier with the molasses, which reduces the losses in the last stage of crystallization.

The crushing of the sugar may be effected by any suitable apparatus but for the oversized crystals ejected at high speed during the first drying, which must be crushed, one will preferably use crushing by projection. A device is added to the first drier to assure this function; it is constituted essentially by a receiving metal sleeve which is constantly cleaned by rotating wipers so disposed that the crystals are forcefully projected and subjected to an impact capable of breaking them. This manner of crushing has a selective action. In effect, the crystals are slowed down in their trajectories by the friction in the air. This slowing down is the more pronounced as the specific surface of the crystal is large and, therefore, its dimension is small. Starting with a given initial speed and the selected length of the trajectory, it is possible to collect the small crystals without breaking them while the large crystals retain an impact speed capable of causing their rupture.

The preparation of the magma which is to be subjected to the two dryings and of the magma for seeding is made in mixers which are advantageously provided with control systems for the content of crystals in the magma and level controls.

The invention has the following advantages:

No delivery to the continuous crystallization apparatus of a solution richer than that to be extracted.

Easy management of the crystallization starting with an optimum proportion of seeds permitting to obtain the best conditions of speed and extraction for a given growth coefficient.

The possibility of obtaining crystals of a size superior to the cut-off of separation by the centrifugal drying, thus permitting avoidance of the enrichment of the dried mass.

The following description refers to the accompanying drawings which illustrate the invention and wherein.

Figure 1:
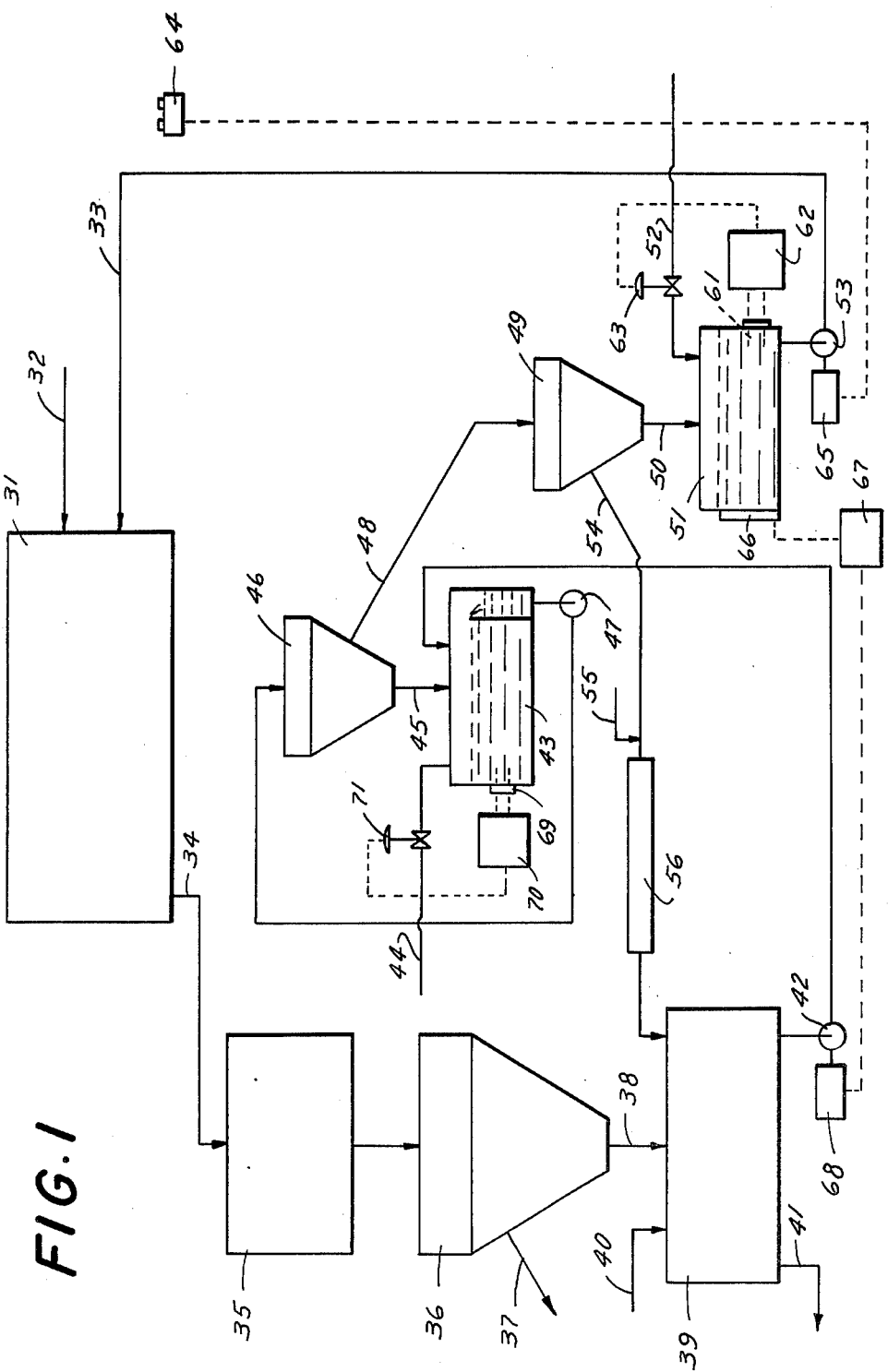
FIG. 1 is a schematic view of an installation for carrying out the process of the invention applied to a continuously operating crystallizer.

The schematic view in FIG. 1 shows the principle of a continuous crystallization of the third strike of a sugar refinery, with continuous delivery of selected crystallization seeds. It is understood that the details of the schematic view used for the understanding of the process in no way limit the scope of the process of this invention to sugar refining, nor is this process limited to the nature of the treated product or the type of apparatus described herein. To indicate the general character of the process, the sugar refinery terms are indicated in parentheses in the following description to exemplify the generic terms.

The schematic view of FIG. 1 shows a continuous crystallization apparatus 31 (continuous vacuum pan of the third strike) fed at 32 with a solution to be extracted (poor molasses of the second strike) and at 33 by a suspension of crystallization seeds (magma 3). in the apparatus, the solution is maintained at super-saturation by evaporation under vacuum, which leads to crystallizable material collecting on the crystallization seeds, which grow. The suspension of crystals (massecuite of the third strike) is extracted at 34. The crystallization is followed by cooling in a mixer 35. The cooled product from mixer 35 is dried in a continuous centrifugal drier 36 which produces, on the one hand, a liquid phase 37 (molasses) and, on the other hand, crystals 38 (sugar from the third strike). These crystals fall into a mixer 39 whereinto a purer solution (low purity molasses of the second strike) is delivered at 40 to form a suspension (magma 2). This suspension is recycled at 41, either to obtain refined crystals or to serve as crystallization seeds at a stage of increased purity (continuous vacuum pan of the second strike). A part of the suspension is removed by a metering pump 42 to be directed to a mixer 43 and there to be mixed with a solution delivered at 44 and of the same nature as that utilized in the previously mentioned mixer, and with crushed products 45 coming from a continuous centrifugal drier 46 which will be described hereinbelow with reference to FIG. 3. This drier is designed to assure the impact crushing of crystals which are too large to pass through the openings of the screen of the drier.

In the case of sugar refineries where a remelting of the sugar of the third strike (in the particular case of beet sugar refineries) is effected directly, a controlled output of sugar crystals coming from drier 36 is introduced directly into mixer 43 before remelting.

The suspension obtained in the mixer 43 is recycled by a metering pump 47 to the drier 46. The crystals passing through the openings of the screen of this drier are removed at 48 with the liquid phase and are fed to a second continuous centrifugal drier 49 represented in FIG. 4. The crystals whose dimensions are larger than those of the openings of the screen of the drier 49, which are smaller than those of the screen of the drier 46, are removed at 50. These are the crystals whose dimensions are encompassed by the fixed range. They fall into a mixer 51 which receives at 52 a solution of the same purity (molasses of the second strike) as that whose extraction by crystallization is to be assured. The thus constituted magma (magma 3) is recycled by a metering pump 53 to be injected into the continuous crystallization apparatus (vacuum pan of the third strike). The crystals of dimensions smaller than the openings of the screen of drier 49 contained in the output 54 of the drier are remelted by injection of a small proportion of water at 55, are reheated at 56 bringing the suspension to below saturation; the obtained solution is recycled to the mixer 39.

In the industrial realization of this process, the management may be facilitated by an automatic control. By way of non-limiting example, a preferred control will be described.

The content of crystallization seeds in the magma in mixer 51 is measured by a conductivity meter 61. The measurement is transmitted to a control 62 which actuates a valve 63 disposed in conduit 52 in such a manner as to maintain this content equal to a fixed operating value.

By a manual control 64 acting upon the pump speed regulator 65, the output of the suspension of seeds (magma 3) extracted from mixer 51 is so controlled that a desired crystal population is obtained in the crystallizer. A level meter 66 acting upon the control 67 controls a governor 68 which adjusts the output of the pump 42 which removes the suspension of crystals (magma 2) from the mixer 39. A conductivity meter 69 acting upon the control 70 regulates the output of a valve 71 disposed in the conduit 44 so as to maintain the content of crystals in the magma in the mixer 43 constant.

Figure 2:
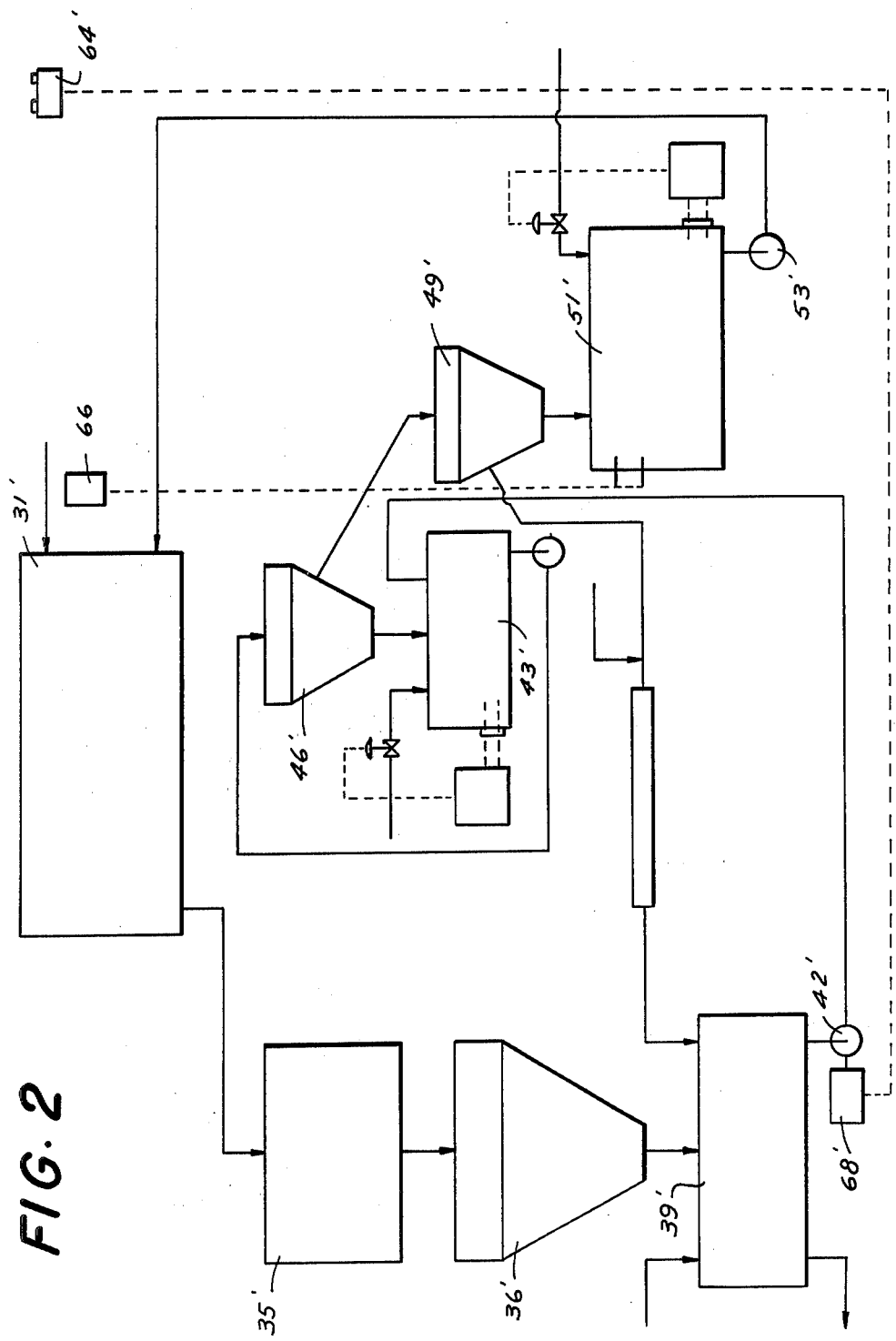
FIG. 2 is a schematic view of another installation for carrying out the process of the invention in the case of its application to a batch crystallizer.

FIG. 2 shows an installation which is analogous to the preceding one for a crystallization apparatus 31' which operates discontinuously. In this case, the output of the pump 42' is adjusted by the speed governor 68' remote-controlled by a switch 64' so as to constitute a reserve of the seed suspension (magma 3). The level of the mixer 51' is recorded on level meter 66. The pump 53' is operated each time magma is required.

Figure 3:
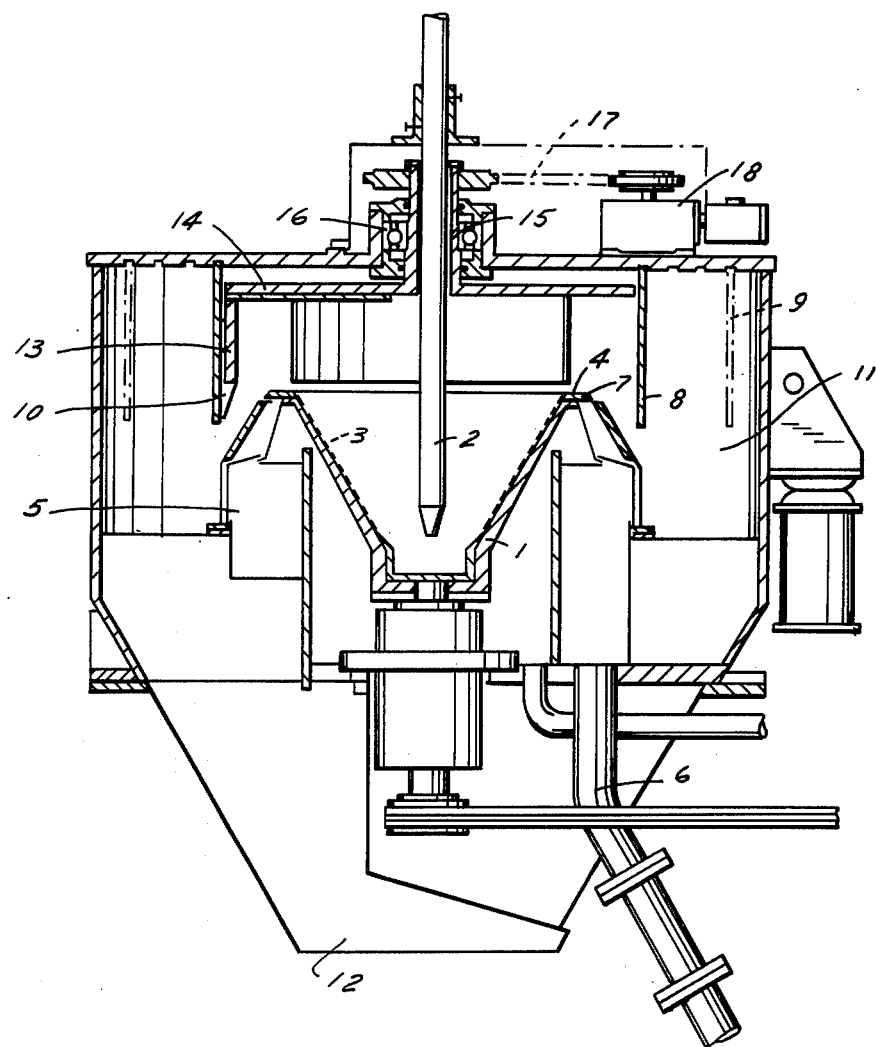
FIG. 3 is an axial section of a drier for use in the installation of FIGS. 1 and 2.

The drier 46 shown in FIG. 3 comprises a conical basket 1 rotating at high speed and to which the suspension of the product to be dried is fed through the delivery tube 2. The liquid phase passes through the screen 3 whose mesh size is selected to retain crystals of a size larger than that of the desired crystals which are entrained with the liquid passing through the screen. This product circulates over the wall of the basket and is then centrifugally ejected through orifices 4 disposed at the periphery of the basket. It is collected in a circular receptacle 5 whence it is removed by an output pipe 6. The solid phase retained on the screen is ejected practically at the tangential speed of the basket above the flange 7 to be projected against a cylindrical metallic sleeve 8. A certain number of sleeves of different diameters are provided to permit the length of the trajectory to be selected as a function of the desired size of the crushed product, the sleeve 9, in chain-dotted lines, being that of the largest diameter. The peripheral speed of the basket and the length of the trajectory are so selected that the largest projected crystals arrive at the sleeve with a speed such that they are broken by the effect of the impact and that the small crystals, moreover, slowed down by the friction in the air are not broken or are subjected only to a partial erosion. The products, although energetically dried, are sticky in the pulverized state; to avoid an accumulation of the products, which would modify the rupturing conditions of the crystals, the sleeve is cleaned by rotating wipers 10.

The number and the speed of rotation of these wipers are such that the impact conditions vary little. It would also be possible to use a rotating sleeve on which fixed wipers acted. The crushed products fall into the annular chamber 11 to be removed through orifice 12. The wipers are mounted on supports 13 fixed in operating position on platform 14 which entrains them into rotation. The entrainment shaft 15 of this platform is hollow so as to permit passage of the delivery tube; it is journaled in bearing 16 integral with the cover of the drier and is rotated by transmission 17 and a reduction motor assembly 18.

Figure 4:
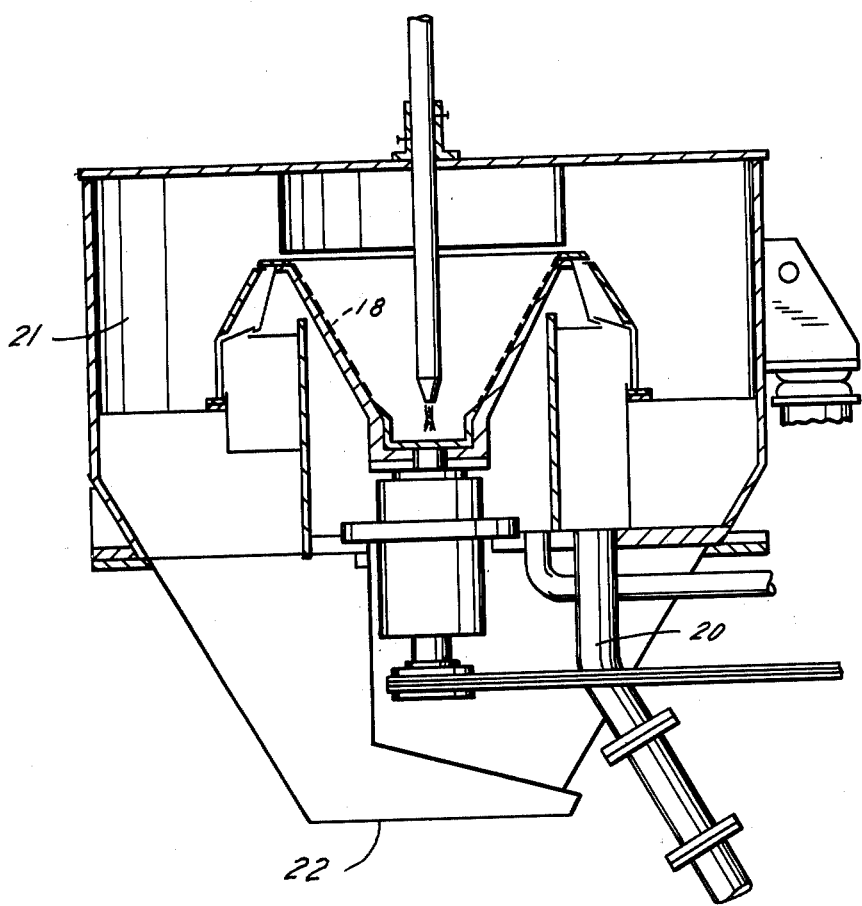
FIG. 4 is a section of another drier used in the installation of FIGS. 1 and 2.

The drier 49 represented in FIG. 4 is of a conventional construction and will not be described in detail. It receives the dried product of the drier 46 which contains crystals whose dimensions are inferior to those of the openings of the screen of the latter. The screen 18 of the drier 49 has smaller openings. The crystals whose dimensions are inferior to those of these openings are removed with the liquid phase through pipe 20. The larger crystals, which are selected to constitute the crystallization seeds, are collected in the tank 21 and removed through the orifice 22.

By way of example, in the case of a third strike of a sugar refinery, the dimensional limits of the crystallization seeds may be fixed between 0.050 mm and 0.125 mm; the drier 46 will have a screen with meshes of 0.130 mm and the drier 49 a screen with meshes of 0.60 mm. If one allows a volumetric growth of 15 to 16 in the crystallization apparatus, the crystals of the massecuite product will have dimensions comprised between 0.125 and 0.315 mm and an average width of 0.220 mm.

I claim:

1. Process of producing crystallization seeds for seeding a solution of a crystallizable product, which comprises forming a suspension of crystals produced from the seeded solution in a fraction of the said solution, subjecting the said suspension to a first centrifugal separation wherein crystals whose size is superior to a predetermined maximal dimension are separated from the said suspension, subjecting the said suspension to a second centrifugal separation wherein crystals whose size is inferior to a minimal predetermined dimension are removed with the suspension, and seeding the said solution with the crystals separated from the suspension in the course of the second separation.

2. Process according to claim 1, wherein the crystals removed with the said suspension in the second separation are dissolved and the obtained solution is recycled to the said suspension.

3. Process according to claim 1, wherein the crystals separated from the suspension in the course of the second separation are mixed with another fraction of the said solution to form a seeding magma and the seeding magma is metered to the said solution.

4. Process according to claim 3, wherein the crystallization seeds are produced continuously in the second separation and the crystals are fed continuously to the said solution for continuously crystallizing the product, and the output of the suspension subjected to separation is maintained proportional to the output of the solution of the crystallizable product, the percentage of crystals in the said suspension being maintained constant.

5. Process according to claim 3, wherein the crystallization seeds are produced continuously in the second separation and the seeding magma is stored, the crystallizable product being crystallized discontinuously and batches of the stored seeding magma being fed to the said solution during crystallization.

6. Process according to claim 1, wherein the crystals separated from the suspension in the course of the first separation are crushed and the crushed crystals are recycled to the said suspension being subjected to the first separation.

7. Process according to claim 6, wherein the crystals are crushed by projecting them at high speed against an impact surface.

8. Installation for carrying out the process of claim 6, comprising a first mixer for forming the said suspension of crystals, a first centrifugal separator arranged to receive the said suspension and having a screen to separate crystals, the mixer having an input receiving the crystals from the separator, a second centrifugal separator arranged to receive the suspension of crystals having passed across the screen of the first separator, the mesh size of the screen of the second separator being smaller than that of the screen of the first separator, and a second mixer arranged to receive crystals separated from the suspension in the second separator, the second mixer having an output for the crystals, and a variable output pump connected to the output for feeding the crystallization seeds to a crystallization apparatus for the solution.

9. Installation according to claim 8, wherein each mixer comprises an element for measuring the crystal content of the product contained in the mixer, conduit means for feeding the suspension thereto, a valve in the conduit means, and a control controlling the valve in response to indications of the measuring element to maintain the content of crystals equal to an operating value.

10. Installation according to claim 8, wherein the second mixer comprises a level control which controls the feeding of the first mixer.

* * * * *